June 10, 1930. R. L. CLARK ET AL 1,762,385
COMBINED SEPARATOR AND TRAP ASSEMBLY
Filed Dec. 22, 1928
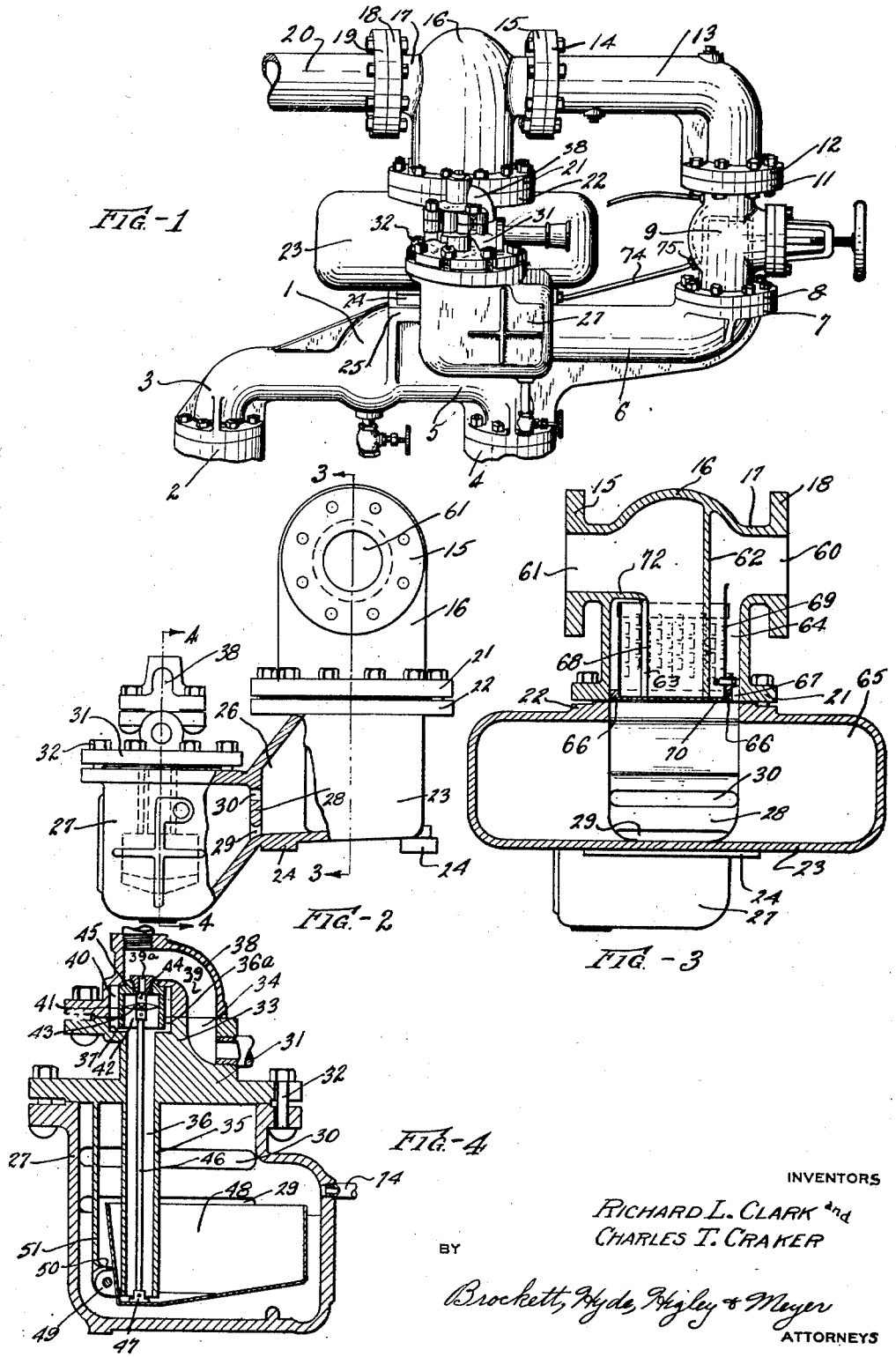
INVENTORS
RICHARD L. CLARK and
CHARLES T. CRAKER
BY
Brockett, Hyde, Higley & Meyer
ATTORNEYS Patented June 10, 1930

1,762,385

UNITED STATES PATENT OFFICE

RICHARD L. CLARK, OF CLEVELAND, OHIO, AND CHARLES T. CRAKER, OF CORRY, PENNSYLVANIA, ASSIGNORS TO STRONG-CARLISLE & HAMMOND COMPANY, OF CLEVELAND, OHIO, A CORPORATION OF OHIO

COMBINED SEPARATOR AND TRAP ASSEMBLY

Application filed December 22, 1928. Serial No. 328,040.

This invention relates to steam supply assemblies for engines and particularly to the intimate association of steam separator and trap structures, as well as in some instances the addition of a throttle valve also closely associated with said association of separator and trap structures.

In the case of some types of engines used in oil fields, for example, it is necessary to insure to said engines the supply of what might be termed dry steam, to permit their immediate operation without the necessity of blowing off any water of condensation which may collect in the steam line or which may be blown over for any reason from the boiler. These engines as a rule are started at a full throttle after they have been standing for some time, and if water is permitted to pass to the engines, great damage results, as is well understood by those skilled in this art.

The present invention contemplates the use of a separator having a relatively large water receiving portion connected to drain through large ports directly to the top of the trap casing or receiver, the bottom of the separator receiver being in horizontal alignment with the upper edge of the bucket of the trap when elevated so that the trap will receive any quantity of water which may collect in the separator. It is important to have the separator receiver of sufficiently large capacity to receive any slug of water which may come over from the steam line.

In the preferred arrangement of the invention, the steam separator and trap structures are practically joined in a single unit inserted in the line between the boiler and the throttle valve with the throttle valve closely connected to the engine manifold which is closely associated with the unit of separator and trap structures.

Other features of the invention will be brought out in the following description, drawings and claims.

In the arrangement shown in the drawings, Fig. 1 is a side elevation of the complete assembly; Fig. 2 is an elevation of the steam trap and the steam separators, portions of the lower separator and the trap being broken away, Fig. 1; Fig. 3 is a vertical sectional view of the two separators upon the line 3—3, Fig. 2; and Fig. 4 is a vertical sectional view of the steam trap on the line 4—4, Fig. 2.

In the drawings, 1 represents a manifold having one or two engine inlets, the number depending upon the type of engine. The apparatus here illustrated is designed for a duplex engine so that the manifold 1 has two inlets, an inlet 2 connected to the manifold by a tubular arm 3 and an inlet 4 connected to the manifold by a like arm 5. One end of a steam line 6 is connected to said manifold and is provided at its other end with a horizontally disposed flange 7 adapted to be bolted or otherwise suitably connected to the lower flange 8 of a throttle valve 9 of any well known globe valve type. An upper flange 11 of said throttle valve is bolted or otherwise suitably connected to the flange 12 of the vertically disposed arm on an L connection 13 having the flange 14 of its horizontally disposed arm bolted or otherwise suitably connected to a flange 15 of an upper separator casing 16. Said separator casing is provided with a steam inlet arm 17 having a flange 18 bolted or otherwise suitably connected to a flange 19 of a steam line 20. Said separator casing is also provided at its lower end with a flange 21 bolted or otherwise suitably connected to the top flange 22 of a lower separator casing 23.

The closed bottom of this lower separator casing is provided with flanges 24 adapted to be secured upon a suitable bed or platform 25 of the manifold 1.

Forming a part of this lower separator casing is a hollow extension 26 connected to and also forming a part of the main bowl 27 of a steam trap. Projecting downwardly from the upper wall of this hollow extension is an apron 28 extending from side to side of the extension and terminating short of the bottom thereof to provide a passageway 29 for water to drain from the lower separator casing directly into the bottom of the trap bowl.

A suitable relief opening 30 is provided in the top portion of the apron which brings said opening at the top of the trap bowl, said opening being for the purpose of disposing of any accumulation of steam or air in the upper part of the trap.

It will be seen from the foregoing that the trap only requires a sufficient quantity of water to overflow its bucket to set it off and produce its operation so that when it receives such volume of water it is actuated thereby tending to always maintain the much larger receiver separator empty.

The trap here shown is of the bucket type and comprises a top cover 31 secured to the trap bowl by suitable bolts 32 and having an upward extension 33 provided near its periphery with a generally vertical discharge opening 34. Integral with said cover is a tubular extension 35 extending down into the trap chamber almost to the bottom thereof, the vertical opening 36 of said extension communicating at its upper end with an enlarged opening 36$^a$ in the upward extention 33. The wall 37 of this opening forms the lower portion of a valve cage chamber.

Secured upon the top of the cover extension is a cap 38 provided with an L-shaped discharge opening 39 having its lower end communicating with the upper end of the discharge opening 34 of the cover extension. The upper end of the cap discharge opening 39 lies above and communicates with a restricted opening 39$^a$ which in turn communicates at its lower end with an enlarged opening 40 forming the upper portion of the valve cage chamber. The chamber thus formed by opening 40 and the upper portion of the extension opening 36$^a$ receives a valve cage 41 having its upper end secured within the restricted opening 39$^a$ and having a downwardly opening cavity 42 for the reception of a valve 44 which is adapted to seat against a hollow valve seat 45 screwed into an opening in the top of the cage, said valve being provided with a horizontally disposed guide 43 also arranged within the cavity 42 of the cage. Secured to the valve 44 is a valve stem 46 extending downwardly through the opening 36 of the cover extension 35 and having its lower end connected to a plug 47 secured to the bottom of a suitable bucket 48. This bucket is open at its top and is provided on the outer surface of one of its end walls, near the bottom thereof, with ears 49 pivotally connected to an ear 50 formed on the lower end of a depending wall 51 carried by the cover 31 and arranged between the trap side wall and the depending cover extension 35. The inner apron 28 causes the water entering the trap chamber to be delivered to the bottom of said chamber, so that it can only enter the bucket 48 by overflowing thereinto, as will be readily understood.

The upper separator casing 16 contains, as illustrated in Fig. 3, the steam separator mechanism and includes a steam inlet 60 leading from the steam line 20 and a steam outlet 61 leading to the horizontally disposed arm of the L connection 13. Said inlet and said outlet are in substantially horizontal alignment and are separated by a vertically disposed partition 62 here shown as integral with the top portion of casing 16 and the top portion of an upright tubular member 63 centrally disposed within the chamber 64 of the upper separator. This chamber 64 is separated from the chamber 65 of the lower separator 23 by a transverse wall 66 having a peripheral opening 67 providing communication between the two chambers, as best indicated in Fig. 3.

The tubular member 63 extends from the bottom of the outlet passage 61 to said transverse wall 66 and is provided with a vertically disposed slot 68 extending substantially the full height thereof. Fig. 3 is a sectional view taken through the center line of the slot. Surrounding this tubular member and of substantially the same height thereof is a perforated cylindrical wall 69 having its lower end engaging the transverse wall 66, which is provided with an opening 70 to provide access between the chamber 65 of the lower separator 23 and that portion of the upper separator chamber 64 which lies between the tubular member 63 and the perforated cylindrical wall 69 thereabout. The upper end of the tubular member 63 is open to the outlet 61 but a wall 72 shuts off all other communication between the upper separator chamber 64 and the outlet 61, said wall being horizontally disposed and being shown as of integral construction with the upper separator casing 16 and the tubular member 63.

In the operation of the separator mechanism, the steam enters the inlet 60, and due to the partition 62 passes down into the chamber 64 of the upper separator, both outside of the perforated cylindrical baffle member 69 and inside of said member between it and the inner tubular member 63. Any entrained water passes down into the chamber 65 of the lower separator casing through the openings 67 and 70 in the transverse wall 66 between the two chambers of the upper and lower separators. The steam finally passes into the tubular member 63 through the slot 68 thereof and out through the upper end of said tubular member into the outlet 61. From the outlet, the steam passes through the L connection 13, the throttle valve 9, and through the steam line 6 to the manifold 1, from which it passes into the engine through the inlets 2 and 4. Any water or moisture reaching the throttle valve is led directly into the chamber of the steam trap through a pipe 74 connected by a nipple 75 connected to the throttle valve 9 and communicating with its steam supply side.

It will thus be seen that by the assembly of the parts here described in the manner described, the engine is equipped to instantly handle a full head of steam directly from the throttle without danger of water or moisture being passed to the engine. Assemblies of this sort are particularly useful with engines used in oil fields, since said engines receive scant care and consideration as a rule and are usually called upon for immediate duty or performance.

Having described our invention, we claim:

1. An assembly of the class described comprising an engine manifold, a separator and structure carried thereby, said trap having a bowl and a closely coupled steam line including a throttle valve connecting the separator of said structure with the manifold, said separator comprising an upper unit and a lower unit having a hollow extension forming a part of the bowl of the trap for quickly and directly discharging the water of condensation from the separator to the trap.

2. An assembly of the class described in claim 1 wherein the separator comprises an upper unit and a lower unit having a hollow extension forming a part of the bowl of the trap for quickly and directly discharging the water of condensation from the separator to the trap, and wherein the extension is provided with a suitable baffle apron extending downwardly to a point near the bottom for directing the flow of water to the bottom of the trap bowl.

3. An assembly of the class described in claim 1 wherein the separator comprises an upper unit and a lower unit having a hollow extension forming a part of the bowl of the trap for quickly and directly discharging the water of condensation from the separator to the trap; wherein the extension is provided with a suitable baffle apron extending downwardly to a point near the bottom for directing the flow of water to the bottom of the trap bowl; and wherein the baffle apron is provided with a suitable opening for venting the upper part of the trap bowl to the lower unit of the separator.

4. An assembly as in claim 1 wherein the steam supply side of the throttle valve is vented directly to the trap, so that water of condensation will not collect in the supply side of the throttle valve.

In testimony whereof we hereby affix our signatures.

RICHARD L. CLARK.
CHARLES T. CRAKER.

CERTIFICATE OF CORRECTION.

Patent No. 1,762,385.  Granted June 10, 1930, to

RICHARD L. CLARK ET AL.

It is hereby certified that error appears in the printed specification of the above numbered patent requiring correction as follows: Page 3, line 19, claim 1, before the word "structure" insert the word "trap"; and that the said Letters Patent should be read with this correction therein that the same may conform to the record of the case in the Patent Office.

Signed and sealed this 9th day of September, A. D. 1930.

(Seal)

M. J. Moore,
Acting Commissioner of Patents.